(12) United States Patent
Cai et al.

(10) Patent No.: US 9,676,000 B2
(45) Date of Patent: Jun. 13, 2017

(54) LIGHTING SYSTEM WITH REFLECTIVE COATING HAVING CROSS-LINKED POLYMERIC POWDER AND A PIGMENT

(71) Applicant: GE Lighting Solutions, LLC, East Cleveland, OH (US)

(72) Inventors: Dengke Cai, Mayfield Heights, OH (US); Gary Robert Allen, Chesterland, OH (US); Ashfaqul I. Chowdhury, Broadview Heights, OH (US); Jeyachandrabose Chinniah, Willoughby Hills, OH (US)

(73) Assignee: GE LIGHTING SOLUTIONS, LLC, East Cleveland, OH (US)

(*) Notice: Subject to any disclaimer, the term of this patent is extended or adjusted under 35 U.S.C. 154(b) by 152 days.

(21) Appl. No.: 13/711,991

(22) Filed: Dec. 12, 2012

(65) Prior Publication Data

US 2013/0279174 A1 Oct. 24, 2013

Related U.S. Application Data

(60) Provisional application No. 61/635,463, filed on Apr. 19, 2012.

(51) Int. Cl.
*F21V 7/22* (2006.01)
*B05D 5/06* (2006.01)
(Continued)

(52) U.S. Cl.
CPC ............. *B05D 5/063* (2013.01); *F21V 7/22* (2013.01); *G02B 5/0236* (2013.01);
(Continued)

(58) Field of Classification Search
CPC ......... F21V 7/22; B05D 5/063; G02B 5/0236; G02B 5/0284; G02B 5/0294
See application file for complete search history.

(56) References Cited

U.S. PATENT DOCUMENTS 2,387,038 A * 10/1945 Owens ............... F21V 7/22
116/20
4,007,141 A 2/1977 Wismer
(Continued)

FOREIGN PATENT DOCUMENTS

CN 1638962 A 7/2005
CN 102362203 A 2/2012
(Continued)

OTHER PUBLICATIONS

Search Report and Written Opinion from corresponding PCT Application No. PCT/US2013/033957, dated Jul. 2, 2013.
(Continued)

*Primary Examiner* — Anh Mai
*Assistant Examiner* — Steven Horikoshi
(74) *Attorney, Agent, or Firm* — GE Global Patent Operation; Peter T. DiMauro (57) ABSTRACT

Methods are provided for forming a reflective coating by applying a precursor material onto the substrate; soft curing the precursor material at a first curing energy level; and thereafter, hard curing the precursor material at a second curing energy level having a higher amount of energy than the first curing energy level to form the reflective coating. Other methods are provided for forming a reflective coating a surface of a plastic substrate by heating the surface of the plastic substrate to a deposition temperature, applying a polymeric resin onto the heated surface, and crosslinking the polymeric resin to form the reflective coating. The polymeric resin can include a cross-linkable powder, a cross-linker, and a pigment, with the deposition temperature being about 10° C. or greater than the melting point of the cross-linkable binder. Lighting apparatus formed from such methods are also provided.

9 Claims, 3 Drawing Sheets

(51) Int. Cl.
*G02B 5/02* (2006.01)
*G02B 5/08* (2006.01)

(52) U.S. Cl.
CPC ......... *G02B 5/0284* (2013.01); *G02B 5/0294* (2013.01); *G02B 5/0808* (2013.01)

(56) References Cited

U.S. PATENT DOCUMENTS

| | | | |
|---|---|---|---|
| 6,268,961 B1* | 7/2001 | Nevitt | G02B 5/0226 |
| | | | 349/84 |
| 6,350,821 B1* | 2/2002 | Alford | 525/438 |
| 6,366,397 B1 | 4/2002 | Genjima | |
| 6,455,110 B1 | 9/2002 | Fortuyn | |
| 6,455,440 B1 | 9/2002 | Jeng | |
| 6,737,467 B1 | 5/2004 | Decker | |
| 8,753,750 B2 | 6/2014 | Watanabe et al. | |
| 2003/0113476 A1 | 6/2003 | Fredericksen | |
| 2003/0134978 A1 | 7/2003 | Tullos | |
| 2007/0048499 A1* | 3/2007 | Wu et al. | 428/143 |
| 2010/0239844 A1 | 9/2010 | Teather | |
| 2011/0064939 A1* | 3/2011 | Teather et al. | 428/316.6 |
| 2011/0311721 A1 | 12/2011 | Langlois | |
| 2013/0069023 A1 | 3/2013 | Teather | |
| 2013/0279174 A1 | 10/2013 | Cai et al. | |

FOREIGN PATENT DOCUMENTS

| | | |
|---|---|---|
| EP | 1142937 A2 | 10/2001 |
| WO | 0213978 A2 | 2/2002 |
| WO | 03076845 A2 | 9/2003 |
| WO | 2007056096 A2 | 5/2007 |

OTHER PUBLICATIONS

ASTM Designation:D523-08, "Standard Test Method for Specular Gloss", Current Edition approved Jun. 1, 2008, pp. 1-5.

Unofficial English Translation of Chinese Office Action issued in connection with corresponding CN Application No. 201380020518.5 on Apr. 13, 2016.

PCT Search Report and Written Opinion issued in connection with corresponding PCT Application No. PCT/US2015/057073 on Jan. 18, 2016.

* cited by examiner

LIGHTING SYSTEM WITH REFLECTIVE COATING HAVING CROSS-LINKED POLYMERIC POWDER AND A PIGMENT

PRIORITY INFORMATION

The present application claims priority to U.S. Provisional Patent Application Ser. No. 61/635,463 titled "Methods for Tailoring the Properties of a Reflective Coating Utilizing a Two-Step Curing Process" of Allen, et al. filed on Apr. 19, 2012, which is incorporated by reference herein.

FIELD OF THE INVENTION

Embodiments of the present invention generally involve tailoring the properties of a reflective coating for inclusion in a lighting device. More particularly, certain embodiments relate to a method of forming a reflective coating for inclusion in a lamp device.

BACKGROUND OF THE INVENTION

Reflective coatings or films have been used to selectively reflect or transmit light radiation from various portions of the electromagnetic radiation spectrum, such as ultraviolet, visible, and/or infrared radiation. For instance, reflective coatings are commonly used in the lamp industry to coat reflectors and lamp envelopes. One application in which reflective coatings are useful is to improve the illumination efficiency, or efficacy, of lamps by reflecting infrared energy emitted by a filament, or arc, toward the filament or arc while transmitting visible light of the electromagnetic spectrum emitted by the light source. This decreases the amount of electrical energy necessary for the light source to maintain its operating temperature. Another application of reflective coatings is to improve the efficacy of luminaires by reflecting the visible light from the lamp from a high-reflectance coating on the surface of the luminaire to redirect the light into the intended application space.

In addition to the reflectance (R %) of the reflective coating, the coating can also be described in terms of angular distribution of reflectance, known as the bi-directional reflectance distribution function (BRDF) In general, BRDFs may be characterized as specular (mirror-like) and diffuse. A perfectly specular reflector obeys Snell's Law whereby all light rays exit from the surface at a reflection angle, θ, relative to the normal that is same as the incident angle, θ, if the surface is embedded in air, having index of refraction=1. A perfectly diffuse reflector has a Lambertian BRDF whereby the distribution of reflected light varies as cos(θ), independent of the incident angle. Practical reflectors are neither perfectly specular, nor perfectly diffuse. Any practical specular reflector will have a small component of diffuse reflectance, generally known as scatter or haze. Any practical diffuse reflector will have a small specular component of reflection. A diffuse reflector having a relatively high specular component is generally known as glossy, while a reflector having near zero specular component is generally known as matte or flat. In specular reflection, the angle of the light reflected from the surface is equal and opposite to the angle of the incident light. A diffuse reflector scatters the incident light over a range of directions. While the amount of overall reflectance of a coating can be controlled through its components, the control of the BRDF also depends on the surface morphology (roughness).

Thus, a continuing need exists for new methods of controlling the type and relative amounts of reflectance (e.g., specular vs. diffusive reflection) in a reflective coating, especially for inclusion in a lamp or other lighting device.

BRIEF DESCRIPTION OF THE INVENTION

Aspects and advantages of the invention are set forth below in the following description, or may be obvious from the description, or may be learned through practice of the invention.

Methods are generally provided for forming a reflective coating. In one embodiment, a method includes applying a precursor material onto the substrate; soft curing the precursor material at a first curing energy level for a first curing duration; and thereafter, hard curing the precursor material at a second curing energy level for a second curing duration to form the reflective coating; for example, the second curing energy level is a higher temperature than the first curing energy level. Generally, the second curing energy level has a higher amount of energy than the first curing energy level. For example, soft curing at the first energy level can be achieved via heating to a first curing temperature (e.g., about 75° C. to about 100° C.), and hard curing at the second energy level can be achieved via heating to a second curing temperature (e.g., about 10° C. greater than the first curing temperature).

In this embodiment, the precursor material can generally include a cross-linkable binder resin, a cross-linker, and a pigment. The first curing temperature can, in one particular embodiment, be below the softening point of the cross-linkable binder resin in the precursor material, such as about 5° C. or more below the softening point of the cross-linkable binder resin.

Lighting apparatus is also provided that, in one embodiment, can include a glass sheet; a primer coating on the glass sheet; and a reflective coating formed on a glass sheet such that the primer coating is positioned between the reflective coating and the glass sheet. The reflective coating can be formed according to the method discussed above (i.e., utilizing a first curing energy level and a second curing energy level).

In another embodiment, a method is provided for forming a reflective coating on a surface of a plastic substrate. The method can, in certain embodiments, include heating the surface of the plastic substrate to a deposition temperature, and applying a polymeric resin onto the surface of the plastic substrate while at the deposition temperature. The polymeric resin can include a cross-linkable powder, a cross-linker, and a pigment. In this embodiment, the deposition temperature can be about 10° C. or greater than the melting point of the cross-linkable binder. Once applied, the cross-linkable powder and a cross-linker can be reacted (e.g., crosslinked) to form the reflective coating on the surface of the plastic substrate.

The cross-linkable powder can, in certain embodiments, have a melting point that is less than about 100° C. (e.g., about 60° C. to about 90° C.). As such, in particular embodiments, the deposition temperature of the surface of the plastic substrate can be greater than about 100° C. and less than the melting point of the substrate (e.g., about 100° C. to about 150° C.).

A lighting system is also generally provided that includes, in one embodiment, a lamp; a reflector (e.g., that is constructed from a plastic substrate) positioned in close proximity to the lamp to reflect light emitted by the lamp; and a reflective coating deposited on a light reflecting surface of the reflector (e.g., directly deposited). The reflective coating can generally include a cross-linked polymeric powder and a pigment. For example, the reflective coating can reflect at least about 95% of light in the visible spectrum, with a matte finish having a glossy number of about 1 LU or less at 60 degree incident angle.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Reference will now be made in detail to present embodiments of the invention, one or more examples of which are illustrated in the accompanying drawings. This detailed description uses numerical and letter designations to refer to features in the drawings. Like or similar designations in the drawings and description have been used to refer to like or similar parts of embodiments of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 1:
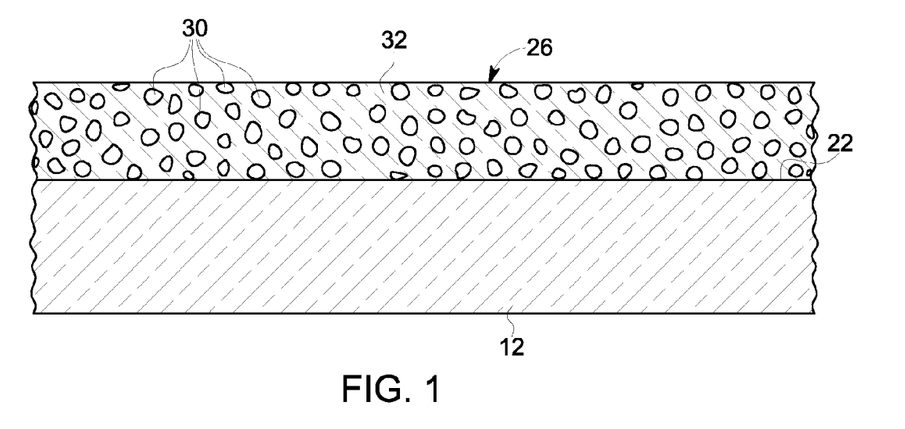
FIG. 1 shows a schematic cross-sectional view of a reflective coating on a substrate.

Methods are generally provided for forming a diffuse reflective coating, along with the resulting coatings formed therefrom. By adjusting the parameters of the method of formation and/or the composition of the coating, the specular reflectance of the resulting reflective coating can be controlled. FIG. 1 shows a reflective coating 26 on a substrate 12. The substrate 12 can be constructed from any suitable material depending on the particular use of the substrate 12 and reflective coating 26. For example, the substrate 12 may be a metal substrate, a ceramic substrate, a plastic substrate, a glass substrate, a quartz substrate, or the like. The detail illustrated in FIG. 1 is meant to be used only for purposes of illustrating the features of the reflective coating 26 and not an exact detail of the reflective coating 26, and is not intended to be drawn to scale. As shown, the reflective coating 26 comprises a cross-linked binder resin 32 containing pigment particles 30.

Figure 2:
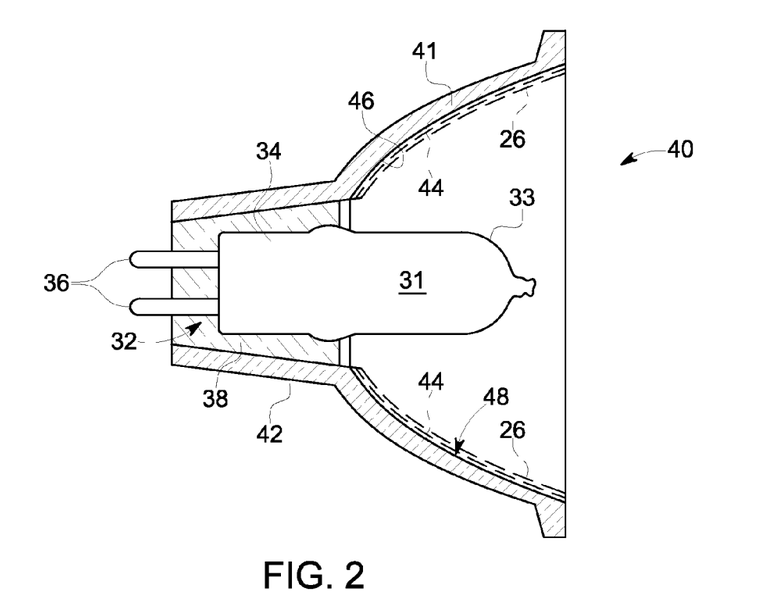
FIG. 2 shows a schematic cross-sectional view of an exemplary lamp that includes a reflective coating.

FIG. 2 shows one particularly suitable use of the reflective coating 26. As shown, a lamp and reflector combination 40 comprising lamp 31 having a vitreous envelope 33 hermetically sealed at 34 by means of a customary pinch seal or shrink seal and having exterior leads 36. Lamp 31 is cemented into the cavity of the substrate 41 (e.g., a glass reflector) by cement 38 using suitable cements for securing the lamp in the reflector, which are generally known in the art. Lamp 31 may also contain a filament and in-leads or an arc (not shown) within envelope 33. Alternatively, lamp 31 may be a solid state light source that comprises, e.g., one or more light emitting diodes.

As shown, the reflective coating 26, as discussed above, is applied on the interior surface 46 of the parabolic portion 48 of the substrate 41, which may be a glass substrate, a metal substrate, etc. However, in other embodiments, the reflective coating 26 can be disposed on the outer surface 42 of substrate 41. The reflective coating 26 may be positioned directly on the inner surface 46, or onto an optional primer coating 44, if desired. For example, the primer coating 44 can improve adherence and/or reflectance of the reflective coating 26. In one embodiment, the primer coating 44 can include the same materials as discussed above with respect to the reflective coating 26, which may be independently selected regardless of the composition of the reflective coating 26. In one particular embodiment, the primer coating 44 can generally include the same components (i.e., a cross-linkable binder, a cross-linker, and a pigment), but with different relative amounts (i.e., less pigment and more binder) to improve adhesion between the substrate and the reflective coating. Or, the primer coating 44 may include materials and components that enhance the reflectance of the coated substrate, but are less expensive than those in the reflective coating 26, so that a lesser amount of the reflective coating 26 may be used to achieve an overall high reflectance.

During operation of the lamp and reflector combination 40, little or none of the light emitted by the lamp 31 is discernible from the outside surface 42 of substrate 41, due to the reflective coating 26 present on the substrate 41.

Figure 3:
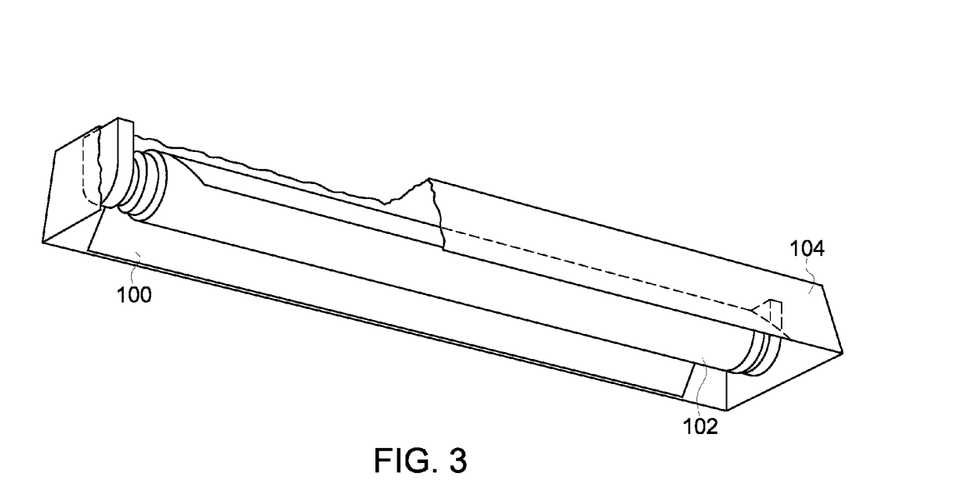
FIG. 3 shows another exemplary lighting system that includes a conformable reflector positioned between the lamp and the fixture housing installed in a conventional fluorescent lighting fixture.
Figure 4:
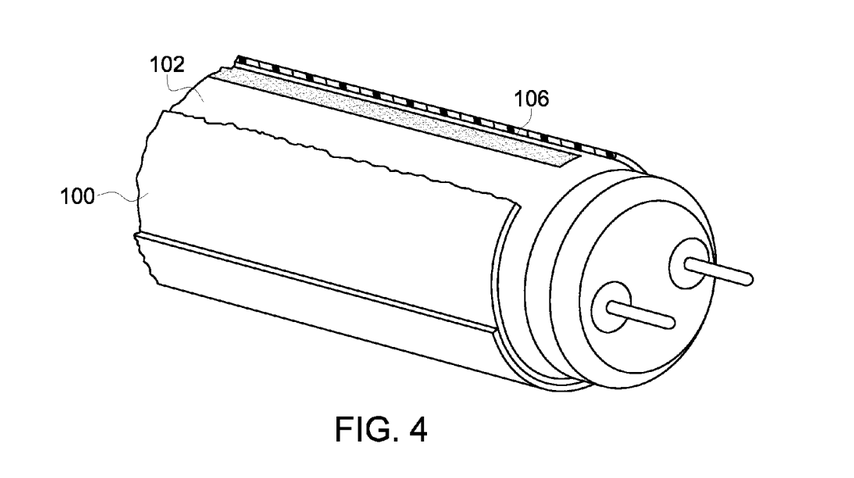
FIG. 4 shows one embodiment of the lighting system of FIG. 3, with the reflector attached to the glass tube by a stripe of adhesive.

FIG. 3 shows another exemplary lighting system that can utilize the reflective coating formed by the presently described methods. The exemplary lighting system of FIG. 3 includes conformable reflector 100 positioned between a lamp 102 and the fixture housing 104 when the lamp-reflector combination is installed in a conventional fluorescent lighting fixture. As used herein, conformable is understood to mean sufficiently flexible to be wrapped about a lamp (e.g., fluorescent lamp) and sufficiently resilient to retain a shape removed from the lamp when released. The reflector 100 can be, in one embodiment, permanently attached to the glass tube 102 by a stripe of adhesive (e.g., glue) as shown at 106 in FIG. 4. The stripe 106 may extend the full length of the reflector or may be comprised of several short stripes aligned with the lamp along the reflector. As shown in FIG. 4 the reflector 100 is made of a conformable material, so that the reflector can be wrapped closely about the outer surface of the fluorescent tube 102 for shipment and handling, so that no additional space is required in the packaging and shipping containers for the lamp reflector combination of the present invention. In one particular embodiment, the conformable reflector 100 can be constructed of a substrate and a reflective coating, such as shown in FIG. 1 and described above.

Figure 5:
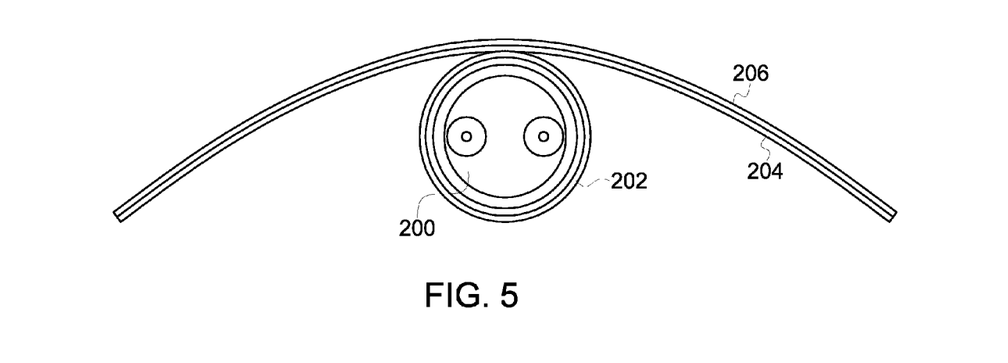
FIG. 5 shows another exemplary lighting system that utilized a collar of flexible material surrounding the lamp.

An alternative embodiment of a lighting system is illustrated schematically in FIG. 5. As shown, a collar of flexible material, such as a plastic, surrounds the lamp 200 and is glued into a ring 202 with a second strip 204 of flexible material, such as a plastic, glued to the collar to which the reflector sheet 206 is attached by, for example, gluing. In one particular embodiment, the reflector sheet 206 can be constructed of a substrate and a reflective coating, such as shown in FIG. 1 and described above. A plurality of such collars can be attached to the reflector along the axial length thereof with the number selected to provide the necessary support and shaping for the reflector. The collars 202 can be made of such size that a frictional engagement exists between the exterior surface the glass tube of the lamp 200 and the inner surface of the collars with sufficient friction to allow positioning of the collars 202 and thereby the reflector 206 at any desired angular position relative to the axis of the fluorescent lamp. Other techniques of fastening the reflector to the fluorescent lamp are suitable, so long as the conformability of the reflector is maintained.

The fluorescent lamps with the attached conformable reflectors can be shipped as a single unit with the reflector and its support mechanism, if any, wrapped closely about the circumference of the fluorescent lamp. After installation of the fluorescent lamp tube in a lighting fixture, the reflector which is bound by a removable binding such as a removable adhesive or by adhesive tape or masking tape, is released to expand away from the surface of the fluorescent lamp. If the lamp and reflector combination is installed in a lighting fixture having a structure surrounding the lamps, the reflector, after release from its compact position, can be moved by the installer to conform a desired position and shape within the fixture, using the fixture as support. In a fixture in which the reflector may expand without interference the reflector will conform to its own natural shape which will be dictated by the resilience of the material of the reflector, the thickness of the reflector and the mechanism of attachment to the fluorescent lamp. As stated, the reflector can generally be constructed of a substrate and a reflective coating, such as shown in FIG. 1 and described above.

In one embodiment, the reflective coating 26 can be formed from a precursor material via a curing process that includes at least two-steps (e.g., a soft curing and a hard curing). For example, the method can include applying a precursor material onto a substrate, and then soft curing the precursor material at a first curing energy level for a first curing duration. Thereafter, the precursor material can be hard cured at a second curing energy level for a second curing duration to form the reflective coating 26. The second curing energy level can, in one particular embodiment, have a higher amount of energy than the first curing energy level. Additional curing steps (e.g., a third curing energy level for a third duration) may also be included in the method, as desired.

In one particular embodiment, the precursor material utilized to form reflective coating 26 can generally include a cross-linkable binder resin, a cross-linker (i.e., a cross-linking agent), and a pigment. Each of these components can be in a dispersion, emulsion, solution or other mixture, with a carrier solvent(s) that generally evaporates during the curing process. Thus, the resulting reflective coating 26 generally includes the cross-linked binder and cross-linker (i.e., forming the cross-linked binder resin 32), and the pigment (i.e., the particles 30).

The cross-linkable binder resin can generally include at least one cross-linkable polymeric binder that interacts with the cross-linker to form a 3-dimensional polymeric structure. Generally, it is contemplated that any pair of cross-linkable polymeric binder and cross-linker that reacts to form the 3-dimensional polymeric structure may be utilized. As such, the cross-linkable binder can include any suitable cross-linkable material prior to cross-linking, and can encompass monomers, oligomers, and (co)polymers which may be further processed to form cross-linking Particularly suitable cross-linkable binders include those that contain reactive carboxyl groups (e.g., acrylics and methacrylic, polyurethanes, ethylene-acrylic acid copolymers, and so forth). Other desirable cross-linking binders include those that contain reactive hydroxyl groups (e.g., polyesters such as to polyethylene terephthalate). Combinations of these materials can also be used to form the cross-linkable binder resin. Depending on the chemical structure, the cross-linkable binder can be a thermoplastic or thermoset material.

As stated, the cross-linker can be selected to cause cross-linking between the cross-linkable binder and/or the cross-linker. The cross-linker (also referred to as a cross-linking agent) can include, but is not limited to, polyfunctional aziridines (e.g., triglycidyl isocyanurate), epoxy resins, carbodiimide, oxazoline functional polymers, melamine-formaldehyde, urea formaldehyde, amine-epichlorohydrin, multi-functional isocyanates, and so forth. In one particular embodiment, for instance, the cross-linker can be a polyisocyanate compound.

Additionally, the cross-linking agent can be selected based on the chemistry of the binder. For example, particularly suitable cross-linking agents for cross-link binders having carboxyl groups can include, but are not limited to, polyfunctional aziridines (e.g., triglycidyl isocyanurate), epoxy resins, carbodiimide, oxazoline functional polymers, and so forth. Similarly, particularly suitable cross-linking agents that can be used to cross-link binders having hydroxyl groups include, but are not limited to, melamine-formaldehyde, urea formaldehyde, amine-epichlorohydrin, multi-functional isocyanates, and so forth.

Combinations of cross-linkers can be utilized, particularly when utilizing a combination of cross-linking binders in the precursor material.

The pigment 30 of the reflective coating 26 is generally reflective to light having wavelengths in a certain range. A single type of pigment 30 can be utilized, or a combination of pigments can be utilized. As such, the pigment 30 can provide a color to the reflective coating 26 by reflecting certain wavelengths of light. For example, the pigment 30 can be selected for inclusion in the reflective coating 26 by its composition, particle size, and/or density for its reflectance characteristics.

Exemplary pigments 30 that are particularly suitable for inclusion within the reflective coating include, but are not limited to, metal oxide inorganic particles (e.g., $TiO_2$, $Al_2O_3$, $Y_2O_3$, $ZrO_2$, $Ta_2O_5$, $Nb_2O_5$, etc.), mixed metal oxide particles (MMOs), complex inorganic color pigments (CICPs), inorganic metal particles (e.g., BN, SiC, etc.), other inorganic pigments known for white or colored pigmentation of coatings, or combinations thereof. In certain embodiments, these pigments can be present in the reflective coating 26 from about 1% by weight to about 90% by weight of the cured reflective coating 26 (i.e., the dry weight), such as from about 25% by weight to about 75% by weight. In particular embodiments, the pigments may be included in the precursor material (i.e., prior to application onto the substrate and drying) in an amount of about 10% by weight to about 60% by weight when wet, such as about 30% to about 45% by weight.

One particularly suitable precursor material is available commercially under the trade name Valspar PTW90135 from The Valspar Corporation (Minneapolis, Minn.), which includes about 35% to about 40% by weight of titanium oxide particles in its wet state with a cross-linkable polyester resin and triglycidyl isocyanurate as a cross-linker.

Other additives, such as processing agents, may also be present in the precursor material, including, but not limited to, dispersants, emulsifiers, viscosity modifiers (e.g., thickeners), humectants, and/or pH modifiers (e.g., buffer). Surfactants can also be present in the precursor material to help stabilize the mixture (e.g., as a dispersion, an emulsion, a solution, etc.) prior to and during application. In alternative embodiments, the precursor material can be substantially free from other materials in any significant amount such that the precursor material consists essentially of or consists of the cross-linkable binder resin, the cross-linker, and the pigment.

By utilizing a multi-step curing process, with the first curing energy level being lower than a second curing energy level (and/or other subsequent curing energy levels), the precursor material can be soft cured at conditions that inhibit migration of the pigment in the precursor material and/or inhibit migration of the cross-linkable binder resin in the precursor material. Thus, the first curing energy level and the first curing duration can be, in particular embodiments, sufficient to substantially prevent the uncross-linked portions of the cross-linkable binder resin from softening and/or flowing. Without wishing to be bound by any particular theory, it is believed that soft curing at conditions that inhibit migration of the pigment and/or the cross-linkable binder resin in the precursor material allows for the user to control and set the pigment near the surface of the resulting reflective coating 26, while inhibiting the resin to substantially cover the pigment. Thus, the specular reflectance can be controlled.

The amount of curing energy supplied for the soft curing (e.g., the first curing temperature) can vary depending on the components of the precursor material. For example, soft curing at the first energy level can be achieved via heating to a first curing temperature, which can be below the softening point of the cross-linkable binder resin in the precursor material (e.g., about 5° C. or more below the softening point of the cross-linkable binder resin in the precursor material). In certain embodiments, soft curing can be performed at a first curing temperature that is about 100° C. or less (e.g., about 90° C. or less). In particular embodiments, soft curing can be performed at a first curing temperature that is about 75° C. to about 100° C., such as about 80° C. to about 95° C.

The soft curing can be performed at the first curing energy level for any suitable duration, such as sufficient to inhibit or substantially prevent migration of the cross-linkable binder resin and/or pigment in the precursor material at the hard curing conditions. For example, the soft curing can be performed at a first curing energy level (e.g., a first curing temperature) for a first curing duration that is about 5 minutes or longer. In one embodiment, the first curing duration can be about 15 minutes to about 2 hours, such as about 30 minutes to about 1.5 hours.

After soft curing, the precursor material can be hard cured at a second curing energy level for a second curing duration to form the reflective coating 26. In general, hard curing involves applying more energy to the precursor material than applied during soft curing, to ensure that a reflective coating 26 is formed with sufficient cross-linking (particularly between the cross-linkable binder resin and/or the cross-linker). For instance, the second curing energy level can be a higher amount of energy than the first curing energy level. When thermally cured via heating (i.e., soft cured at a first curing temperature and then hard cured at a second curing temperature), the second curing temperature can be higher than the first curing temperature. In one embodiment, the second curing temperature can be at least about 10° C. greater than the first curing temperature, such as about 25° C. or more. In one particular embodiment, the second curing temperature can be about 100° C. or higher. For example, the second curing temperature is about 100° C. to about 150° C., such as about 105° C. to about 125° C.

Since the softening temperature for uncross-linked resins and partly cross-linked resins are definitely lower than the softening temperature of cross-linked resins, during the first curing, the curing energy (temperature here) is low in order not to soften the cross-linkable binder resin too much, but is high enough to activate the active groups in resins and cross-linker for reaction. After fixed period at the soft curing energy, uncross-linked resins become partly cross-linked. Thus, further increasing the curing energy to further cross-link the resins but not enough softening the partly cross-linked resins. By adjusting the curing energy above the energy of softening resins the gloss can be achieved gradually.

The hard curing can be performed at the second curing energy level for any suitable duration, such as sufficient to cross-link the precursor material to form the reflective coating 26. For example, the hard curing can be performed at a second curing energy level (e.g., a second curing temperature) for a second curing duration that is about 5 minutes or longer. In one embodiment, the second curing duration can be about 15 minutes to about 2 hours, such as about 30 minutes to about 1.5 hours.

In another embodiment, the reflective coating 26 can be formed from a precursor material via a curing process that includes a single curing step for a longer duration. In this embodiment, the long curing step can be performed at the soft curing energy levels (e.g., temperatures) as described above, and for a period of time (i.e., curing duration) that is sufficient to provide a total amount of curing energy required. In one embodiment, as discussed above with respect to the soft curing conditions, the curing temperature can remain below the softening point of the cross-linkable binder resin in the precursor material (e.g., remaining about 5° C. or more below the softening point of the cross-linkable binder resin). For example, the single curing step can be performed at 100° C. or less (e.g., about 90° C. or less), without additional curing at higher temperatures, for a curing duration that is sufficient to inhibit or substantially prevent migration of the cross-linkable binder resin and/or pigment in the precursor material and then sufficiently cross-link the binder to the desired levels. For example, the soft curing can be performed at a first curing energy level (e.g., a first curing temperature) for a first curing duration that is about 2 hours or longer. In one embodiment, the curing duration can be about 2.5 hours to about 10 hours, such as about 3 hours to about 6 hours.

No matter the particular method of curing, the reflective coating 26 can be formed to any desired thickness, but are particularly suitable for films formed on the micrometer (μm) scale. For example, the reflective coating 26 can have a thickness that is about 50 μm to about 500 μm, such as about 100 μm to about 250 μm. This thickness can be achieved via a single layer deposition or multiple layers of deposition.

Through these methods, the type and relative amounts of diffuse reflectance (e.g., gloss vs. matte diffuse reflection) can be controlled in the resulting reflective coating 26. In certain embodiments, the glossy number can be less than about 1 LU (Luster unit) at a 60° and/or an 80° incident angle, as measured by the ASTM test method D523-08, titled "Standard Test Method for Specular Gloss," published in June 2008. For example, the reflective coating can reflect at least about 95% of light in the visible spectrum, with a matte finish having a glossy number down to about 1 LU or less at a 60° incident angle and/or at an 80° incident angle.

In one embodiment, the reflective coating 26 can reflect at least about 95% of light in the visible spectrum, such as at least about 97% of light in the visible spectrum or at least about 99% of light in the visible spectrum. In another embodiment, the reflective coating 26 can reflect at least about 95% of light in the infrared spectrum, such as at least about 97% of light in the infrared spectrum or at least about 99% of light in the infrared spectrum.

The reflective coating 26 formed according to the methods described herein can be utilized in any suitable application. In one particular embodiment, the reflective coating 26 can be utilized in a lighting device. In another particular application it can be utilized as a diffuse reflector of solar radiation such that the reflected glare is very low, while the total reflectance is very high. In another particular application it can be utilized as the reflective coating inside an integrating sphere which is an optical instrument for measuring the total light flux emitted from a light source, typically requiring the combination of very high reflectance and very low gloss over the visible spectrum, or in other optical instrumentation requiring those optical properties of the reflector. In such applications in optical instrumentation, this reflective coating 26 may be considering more rugged, and less expensive than the "integrating sphere paints" that are commonly used.

The reflective coating 26 can be included on any substrate 12, and may be utilized in any lighting device where a reflective coating or paint is present (e.g. fluorescent luminaires, reflectors inside of sealed lamps, cove enclosures surrounding light sources, architectural features that serve to reflect light, desk lamps, and other fixtures that distribute the light from a light source.

In another embodiment, the reflective coating 26 can be formed on a plastic substrate 12 without using electrostatic spray deposition methods, to form a finish on the resulting reflective coating 26 having a controllable specular characteristics (e.g., resulting in a matte finish on the reflective coating). Such electrostatic spray deposition methods typically require a pre-coated conductive layer (not shown) prior to application of the powders, since the polymer substrate is not sufficiently conductive to be used in an electrostatic spray deposition methods. As such, the inclusion of a pre-coated conductive layer prior to application of the powders adds to the cost and complexity of the resulting coated substrate.

In one embodiment, methods and coated substrates are generally provided for forming a reflective coating 26 directly on a plastic substrate 12 (i.e., without any conductive layer positioned therebetween). Particularly suitable plastic substrates 12 include but are not limited to substrates constructed from polycarbonate, polyethylene, acrylonitrile butadiene styrene (ABS), silicone-based polymers, polystyrene, nylon, etc., including co-polymers or mixtures thereof. As such, the plastic substrate 12 can include thermally stable plastics and/or elastomers.

The reflective coating 26 can be formed, in this embodiment, by applying (e.g., via spraying) a polymeric resin including a cross-linkable powder, a cross-linker, and a pigment onto the surface of the plastic substrate 12 after heating the plastic substrate 12 to a deposition temperature. The deposition temperature is generally greater than the melting point of the crosslinkable binder (e.g., about 10° C. or greater than the melting point of the cross-linkable binder) such that upon contact with the heated surface of the substrate 12, the cross-linkable powder melts and then crosslinks with the cross-linker to form the reflective coating 26 on the surface of the plastic substrate 12.

Thus, the material of the cross-linkable powder that interacts with the cross-linker to form a 3-dimensional polymeric structure. Due to the simultaneous melting, cross-linking, and deposition of the polymeric resin, the positioning of the pigment can be fixed during deposition to inhibit migration of the pigment and/or the cross-linkable binder resin in the precursor material. This result allows for the user to control and set the pigment near the surface of the resulting reflective coating 26, while inhibiting the resin to substantially cover the pigment. Thus, the specular reflectance can be controlled.

Generally, it is contemplated that any pair of cross-linkable powder and cross-linker that reacts to form the 3-dimensional polymeric structure may be utilized. As such, the cross-linkable powder can include any suitable cross-linkable material prior to cross-linking, and can encompass monomers, oligomers, and (co)polymers which may be further processed to form cross-linking Particularly suitable cross-linkable powders include those that contain reactive carboxyl groups (e.g., acrylics and methacrylic, polyurethanes, ethylene-acrylic acid copolymers, and so forth). Other desirable cross-linking powders include those that contain reactive hydroxyl groups (e.g., polyesters such as to polyethylene terephthalate). Combinations of these materials can also be used to form the cross-linkable powder. Depending on the chemical structure, the cross-linkable powder can be a thermoplastic or thermoset material.

As stated, the cross-linker can be selected to cause cross-linking between the material of cross-linkable powder and/or the cross-linker. The cross-linker (also referred to as a cross-linking agent) can include, but is not limited to, polyfunctional aziridines (e.g., triglycidyl isocyanurate), epoxy resins, carbodiimide, oxazoline functional polymers, melamine-formaldehyde, urea formaldehyde, amine-epichlorohydrin, multi-functional isocyanates, and so forth. In one particular embodiment, for instance, the cross-linker can be a polyisocyanate compound.

Additionally, the cross-linking agent can be selected based on the chemistry of the powder. For example, particularly suitable cross-linking agents for cross-link powders having carboxyl groups can include, but are not limited to, polyfunctional aziridines (e.g., triglycidyl isocyanurate), epoxy resins, carbodiimide, oxazoline functional polymers, and so forth. Similarly, particularly suitable cross-linking agents that can be used to cross-link powders having hydroxyl groups include, but are not limited to, melamine-formaldehyde, urea formaldehyde, amine-epichlorohydrin, multi-functional isocyanates, and so forth.

Combinations of cross-linkers can be utilized, particularly when utilizing a combination of cross-linking powders in the precursor material.

The pigment 30 of the reflective coating 26 is generally reflective to light having wavelengths in a certain range. A single type of pigment 30 can be utilized, or a combination of pigments can be utilized. As such, the pigment 30 can provide a color to the reflective coating 26 by reflecting certain wavelengths of light. For example, the pigment 30 can be selected for inclusion in the reflective coating 26 by its composition, particle size, and/or density for its reflectance characteristics.

Exemplary pigments 30 that are particularly suitable for inclusion within the reflective coating include, but are not limited to, metal oxide inorganic particles (e.g., $TiO_2$, $Al_2O_3$, $Y_2O_3$, $ZrO_2$, $Ta_2O_5$, $Nb_2O_5$, etc.), mixed metal oxide particles (MMOs), complex inorganic color pigments (CICPs), inorganic metal particles (e.g., BN, SiC, etc.), other inorganic pigments known for white or colored pigmentation of coatings, or combinations thereof. In certain embodiments, these pigments can be present in the reflective coating 26 from about 1% by weight to about 90% by weight of the cured reflective coating 26 (i.e., the dry weight), such as from about 25% by weight to about 75% by weight. In particular embodiments, the pigments may be included in the precursor material (i.e., prior to application onto the substrate and drying) in an amount of about 10% by weight to about 60% by weight when wet, such as about 30% to about 45% by weight.

In this embodiment, the reflective coating 26 can be formed to any desired thickness, but are particularly suitable for films formed on the micrometer (μm) scale. For example, the reflective coating 26 can have a thickness that is about 50 μm to about 500 μm, such as about 100 μm to about 250 μm. This thickness can be achieved via a single layer deposition or multiple layers of deposition. For example, in one embodiment, a relatively base layer can be formed first formed (e.g., to a thickness of about 1 μm to about 50 μm), followed by electrostatic deposition of the remainder of the thickness, to take advantage of faster deposition rates.

Through these methods, the type and relative amounts of diffuse reflectance (e.g., gloss vs. matte diffuse reflection) can be controlled in the resulting reflective coating 26. In one embodiment, the reflective coating 26 can reflect at least about 95% of light in the visible spectrum, such as at least about 97% of light in the visible spectrum or at least about 99% of light in the visible spectrum. In another embodiment, the reflective coating 26 can reflect at least about 95% of light in the infrared spectrum, such as at least about 97% of light in the infrared spectrum or at least about 99% of light in the infrared spectrum.

The reflective coating 26 formed according to the methods described herein can be utilized in any suitable application. In one particular embodiment, the reflective coating 26 can be utilized in a lighting device. In another particular application it can be utilized as a diffuse reflector of solar radiation such that the reflected glare is very low, while the total reflectance is very high. In another particular application it can be utilized as the reflective coating inside an integrating sphere which is an optical instrument for measuring the total light flux emitted from a light source, typically requiring the combination of very high reflectance and very low gloss over the visible spectrum, or in other optical instrumentation requiring those optical properties of the reflector. In such applications in optical instrumentation, this reflective coating 26 may be considering more rugged, and less expensive than the "integrating sphere paints" that are commonly used.

The reflective coating 26 can be included on any substrate 12, and may be utilized in any lighting device where a reflective coating or paint is present (e.g. fluorescent luminaires, reflectors inside of sealed lamps, cove enclosures surrounding light sources, architectural features that serve to reflect light, desk lamps, and other fixtures that distribute the light from a light source.

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth.

It is to be understood that the ranges and limits mentioned herein include all sub-ranges located within the prescribed limits, inclusive of the limits themselves unless otherwise stated. For instance, a range from 100 to 200 also includes all possible sub-ranges, examples of which are from 100 to 150, 170 to 190, 153 to 162, 145.3 to 149.6, and 187 to 200. Further, a limit of up to 7 also includes a limit of up to 5, up to 3, and up to 4.5, as well as all sub-ranges within the limit, such as from about 0 to 5, which includes 0 and includes 5 and from 5.2 to 7, which includes 5.2 and includes 7.

EXAMPLES

Reflective coatings were prepared utilizing the same precursor composition, deposited at substantially the same thickness (between about 25 μm to about 250 μm) onto aluminum and steel substrates under different curing conditions. The precursor composition was purchased under the tradename Valspar PTW90135 from The Valspar Corporation (Minneapolis, Minn.).

| Process conditions | Total R at different incident angles | | | | | | Specular R at different incident angles | |
|---|---|---|---|---|---|---|---|---|
| | 0° | 15° | 30° | 45° | 60° | 75° | 60° | 75° |
| Examples of Two-Step Curing | | | | | | | | |
| soft cure (90° C. for 1 hr) + hard cure (100° C. for 20 min) | 96.6 | 97.4 | 98.1 | 98.5 | 98.7 | 96 | 0 | 0 |
| soft cure (90° C. for 1 hr) + hard cure (120° C. for 20 min) | 95.6 | 96.4 | 96.8 | 96.7 | 96.8 | 92.9 | 0 | 0 |
| soft cure (90° C. for 1 hr) + hard cure (110° C. for 20 min) | 94.9 | 95.7 | 96.2 | 96.6 | 96.6 | 92.4 | 0 | 0.3 |

| Process conditions | Total R at different incident angles angle = | | | | | | Specular R at different incident angles | |
|---|---|---|---|---|---|---|---|---|
| | 0° | 15° | 30° | 45° | 60° | 75° | 60° | 75° |
| soft cure (90° C. for 1 hr) + hard cure (135° C for 20 min) | 96.4 | 96.9 | 97.5 | 97.5 | 96.4 | 91.3 | 0.5 | 0.8 |
| soft cure (90° C. for 1 hr) + hard cure (150° C. for 20 min) | 94.7 | 95.2 | 95.5 | 95.2 | 94.3 | 88.6 | 5.3 | 9.3 |
| Comparative Examples | | | | | | | | |
| 100° C. 20 min | 88.8 | 89.1 | 89.3 | 88.9 | 87.4 | 80.7 | 4.4 | 9.3 |
| 110° C. 20 min | 91 | 93 | 93.3 | 93.2 | 92.5 | 86.5 | 6.3 | 11.8 |
| 120° C. 20 min | 91.3 | 93.7 | 94 | 93.7 | 92.7 | 81.8 | 8.9 | 18.9 |
| 135° C. 20 min | 92.2 | 93.4 | 93.6 | 93.7 | 92.7 | 85 | 7.8 | 17.1 |
| 150° C. 20 min | 93.3 | 94.1 | 94.4 | 94.4 | 93.6 | 89.6 | 6.2 | 11.2 |
| 160° C. 20 min | 94.6 | 95.6 | 96 | 96 | 95.5 | 89.3 | 6.1 | 11.9 |
| 180° C. 20 min | 93.6 | 95 | 95.3 | 95 | 93.8 | 86 | 7.3 | 13.5 |

As shown above, the specular reflectance increases with a temperature increase of the hard curing conditions. Without wishing to be bound by any particular theory, it is believed that the resin softens and flows above the pigment (TiO$_2$) at the higher temperatures for hard curing, resulting in the cross-linked thermoset resin on the surface of the coating, which leads to, in turn, a more glossy surface. Additionally, without the soft curing step, the uncross-linked and partially cross-linked resins softened and flowed over the pigment, resulting in a cross-linked thermoset resin on the surface of the coating, which led to, in turn, a more glossy surface—as shown in the comparative examples having a single curing step at temperatures of 100° C. or more. It is expected that similar results would be obtained on many other metallic substrates by suitable choice of the coating process parameters.

Figure 6:
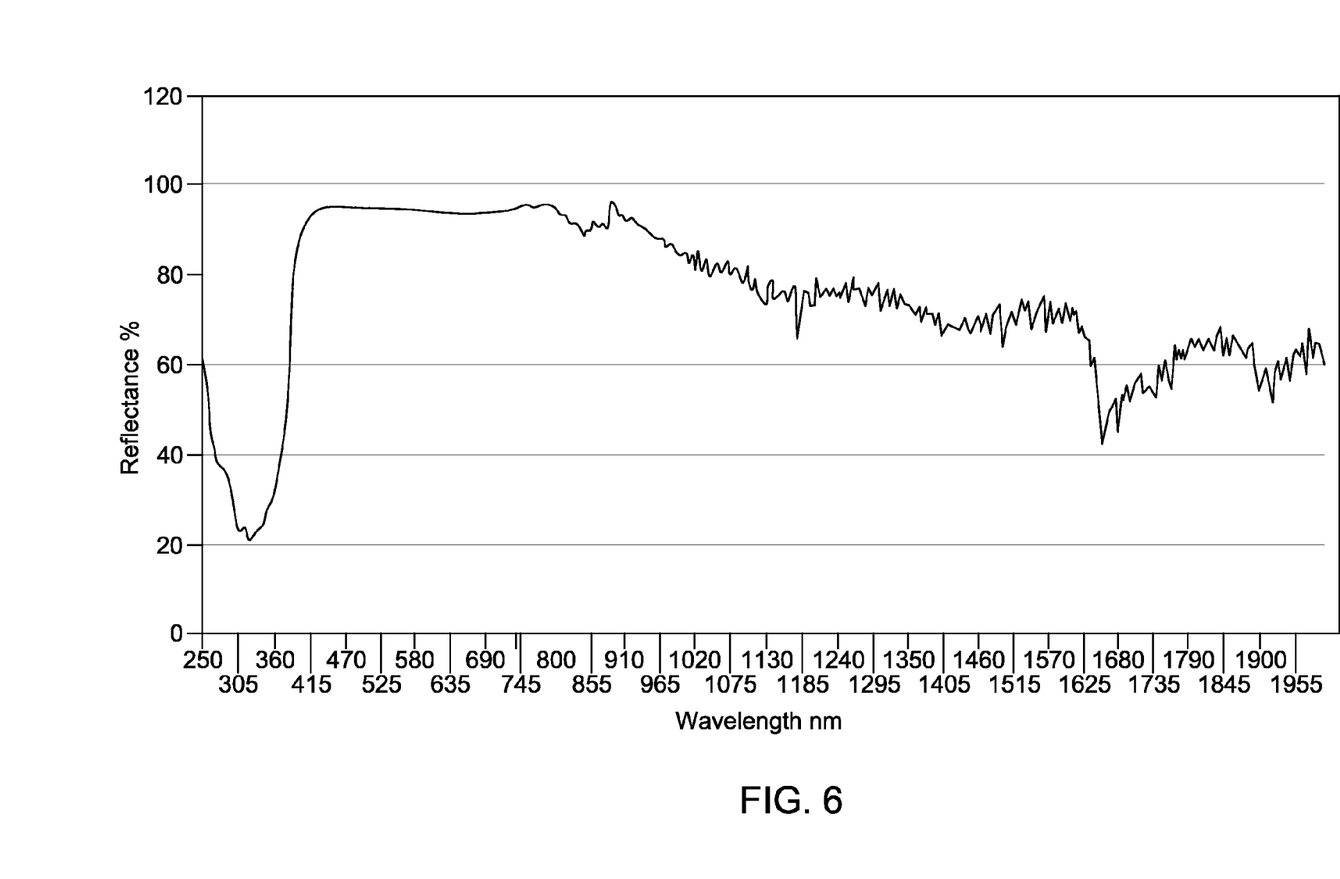
FIG. 6 shows a reflectance spectrum of an exemplary reflective coating.

FIG. 6 shows the reflectance spectra of a reflective coating formed from Valspar PTW90135 from The Valspar Corporation (Minneapolis, Minn.) soft cured at 90° C. for about 15 minutes and then hard cured at 105° C. for about 20 minutes.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal languages of the claims.

What is claimed is:

1. A lighting system, comprising:
   a lamp;
   a reflector positioned to reflect light emitted by the lamp, wherein the reflector comprises a plastic substrate; and
   a reflective coating deposited directly on a light reflecting surface of the reflector, wherein the reflective coating comprises a cross-linked polymeric powder and a pigment;
   wherein the reflective coating reflects at least about 95% of light in the visible spectrum, with a matte finish having a gloss of 1 or less at 60 degree incident angle as measured by ASTM test method D523-08 as published in June 2008.

2. The lighting system as in claim 1, wherein the cross-linked polymeric powder is formed from a cross-linkable powder and a cross-linker.

3. The lighting system as in claim 1, wherein the reflective coating has a coating thickness of about 50 μm to about 500 μm.

4. A lighting system, comprising:
   a lamp;
   a reflector positioned to reflect light emitted by the lamp, wherein the reflector comprises a glass or metal substrate; and
   a reflective coating deposited on a light reflecting surface of the reflector, wherein the reflective coating comprises a cross-linked polymeric powder and a pigment;
   wherein the reflective coating reflects at least about 95% of light in the visible spectrum, with a matte finish having a gloss of about 1 or less at 60 degree incident angle as measured by ASTM test method D523-08 as published in June 2008.

5. The lighting system as in claim 4, wherein the cross-linked polymeric powder is formed from a cross-linkable powder and a cross-linker.

6. The lighting system as in claim 4, wherein the cross-linked powder comprises a polyester resin, and the pigment comprises titanium dioxide.

7. The lighting system as in claim 5, wherein the cross-linker comprises polyfunctional aziridines, epoxy resins, carbodiimide, oxazoline functional polymers, melamine-formaldehyde, urea formaldehyde, amine-epichlorohydrin, multi-functional isocyanates, or combinations thereof.

8. The lighting system as in claim 4, wherein the reflective coating has a coating thickness of about 50 μm to about 500 μm.

9. A lighting system, comprising:
   a lamp;
   a reflector positioned to reflect light emitted by the lamp, wherein the reflector comprises a plastic, glass or metal substrate; and
   a reflective coating having a matte finish deposited on a light reflecting surface of the reflector,
   wherein the reflective coating comprises inorganic pigment particles and a cross-linked resin, the cross-linked resin inhibited from substantially covering the inorganic pigment particles; and
   wherein the reflective coating having a matte finish reflects at least about 95% of light in the visible spectrum and has gloss of 1 or less at 60 degree incident angle as measured by ASTM test method D523-08 as published in June 2008.

* * * * *